US010851923B2

(12) United States Patent
Askestad

(10) Patent No.: US 10,851,923 B2
(45) Date of Patent: Dec. 1, 2020

(54) BALL JOINT FOR CONNECTING A RISER SUBJECTED TO HIGH TENSILE AND ANGULAR LOADS TO A PIPE CONNECTOR ON A FLOATING UNIT

(71) Applicant: APL TECHNOLOGY AS, Kolbjørnsvik (NO)

(72) Inventor: Sigmund Askestad, Tvedestrand (NO)

(73) Assignee: APL Technology AS, Kolbjørnsvik (NO)

(*) Notice: Subject to any disclaimer, the term of this patent is extended or adjusted under 35 U.S.C. 154(b) by 205 days.

(21) Appl. No.: 16/095,417

(22) PCT Filed: Apr. 25, 2017

(86) PCT No.: PCT/NO2017/000011
§ 371 (c)(1),
(2) Date: Oct. 22, 2018

(87) PCT Pub. No.: WO2017/188821
PCT Pub. Date: Nov. 2, 2017

(65) Prior Publication Data
US 2019/0137018 A1    May 9, 2019

(30) Foreign Application Priority Data
Apr. 25, 2016  (NO) .................................. 20160692

(51) Int. Cl.
*F16L 27/053* (2006.01)
*F16L 27/067* (2006.01)
(Continued)

(52) U.S. Cl.
CPC ........ *F16L 27/053* (2013.01); *F16C 11/0695* (2013.01); *F16L 27/067* (2013.01); *F16L 27/073* (2013.01)

(58) Field of Classification Search
CPC ..... F16L 27/053; F16L 27/067; F16L 27/073; F16L 27/06; F16C 11/0695; E21B 17/02
(Continued)

(56) References Cited

U.S. PATENT DOCUMENTS 1,373,515 A * 4/1921 Loomis ................... F16L 27/06
285/13
2,424,897 A    7/1947 Orshansky, Jr.
(Continued)

FOREIGN PATENT DOCUMENTS

DE    2834223 A1 * 2/1980 ............ F16L 27/026
EP    1141609 B1    3/2004
(Continued)

OTHER PUBLICATIONS

International Bureau, International Search Report and Written Opinion in International Application No. PCT/NO2017/000011, dated Aug. 2, 2017.

*Primary Examiner* — James M Hewitt, II
(74) *Attorney, Agent, or Firm* — Leydig, Voit & Mayer, Ltd.

(57) ABSTRACT

A ball joint includes a suspension house comprising an inner side, a house neck and upper flange, wherein a bearing ring, having a liner fastened to its inner surface, and an upper mating surface fastened to the corresponding mating surface on the lower side of the house; a suspension ball, complementary to the inner side of the house, comprising a ball neck and lower flange, the ball having a recess on the inside of the ball, the recess comprising an inner seal ring positioned on a bias ring in the recess; the seal ring providing a seal contacting the inside of the house and a piston seal contacting the inner surface of the recess wherein the bias ring biases the seal ring parallel to the axis of the neck and away from the bias ring.

18 Claims, 8 Drawing Sheets

(51) Int. Cl.
*F16L 27/073* (2006.01)
*F16C 11/06* (2006.01)

(58) Field of Classification Search
USPC .................................................. 285/262–271
See application file for complete search history.

(56) References Cited

U.S. PATENT DOCUMENTS

| | | | |
|---|---|---|---|
| 3,477,748 A | | 11/1969 | Tinsley |
| 3,479,061 A | * | 11/1969 | Smookler ............. F16L 27/073 285/94 |
| 3,712,645 A | | 1/1973 | Herter |
| 4,012,060 A | * | 3/1977 | Reneau ................ F16L 27/053 285/93 |
| 4,068,868 A | | 1/1978 | Ohrt |
| 4,153,278 A | * | 5/1979 | Ahlstone ................ F16L 27/06 285/146.3 |
| 4,671,543 A | | 6/1987 | Miliczky |
| 5,368,342 A | | 11/1994 | Latham et al. |
| 2004/0178628 A1 | | 9/2004 | Laubie |

FOREIGN PATENT DOCUMENTS

| | | |
|---|---|---|
| FR | 2823284 A1 | 10/2002 |
| GB | 2313889 A | 12/1997 |

* cited by examiner

BALL JOINT FOR CONNECTING A RISER SUBJECTED TO HIGH TENSILE AND ANGULAR LOADS TO A PIPE CONNECTOR ON A FLOATING UNIT

CROSS-REFERENCE TO RELATED APPLICATIONS

This patent application is the U.S. National Stage of International Patent Application No. PCT/NO2017/000011, filed Apr. 25, 2017, which claims the benefit of Norwegian Patent Application No. 20160692, filed Apr. 25, 2016, which are each incorporated by reference.

AREA OF TECHNOLOGY

The invention relates to floating structures connected to risers carrying produce and being subjected to high tensile and angular loads. More specifically it relates to a ball joint connecting a riser coming from great depths to a floating device. In general, the ball joint may be used in any fluid conduit requiring joints to handle large angular deviations from one section to the next.

BACKGROUND FOR THE INVENTION

Flexible joints between the top portion of the riser and the floating structure, need to handle up to about 20-25 degrees of angular displacement. The traditional way of terminating flexible risers underneath a floating unit is:

a) by extending them all the way to the deck or turret of the floating structure and using bending stiffeners to reinforce the knuckle point at the lower extremity of a guide tube, which is a tubular rigid structure firmly fixed to the deck or turret, or b) by using a flexible joint at the lower extremity of a guide tube. Here the pipe extending up through a guide pipe as described in the referred patent may be strong enough for flexible pipes at moderate draughts, but as the risers are applied at greater water depths, and higher pressures, the riser tension is getting higher. As the tension is getting higher a transition in the industry towards using steel pipes instead of flexible pipes is taking place. The flexible part or ball joint connecting the catenary part of the riser with a short and stiff extension pipe/connection pipe inside a guide pipe will then be subjected to very high (moment) loads.

A challenge with such ball joints is the sealing of the fluid in the conduit, especially as the supporting bearing is wearing. The problem being that the mating surface for the supporting glide bearing is also mating surface for the seals. The bearing mating surfaces are exposed to scratching and accumulation of wear particles from the bearing, and after some time, the surfaces are not very suitable as a sealing surface. A ball joint located in a riser system is exposed to high dynamic loads from the riser tension besides possible wave action and the internal pressure. This causes additional challenges to the sealing system and the bearing system compared with sealing systems such as in a ball valve.

A ball joint for connecting a flexible pipe and a rigid pipe extension within the floating structure is shown in (APL) Patent No. EP1141609. The characteristic for this design is that the bearing and the seals are both sliding across the same surfaces.

U.S. Pat. No. 4,671,543 presents a ball joint with angular capabilities. The rings 50 and 52 in the reference figure are solid and have both a bearing and sealing function. The seals/bearings are also depending on grease for sealing.

A problem with both these solutions is that for joints requiring a large angular displacement, the bearing surfaces have to be displaced close to the equator of the ball where the sine component of the bearing surface is getting poor, meaning that the bearing loads increases sharply as the bearing is closer to the equator. A further problem which is common for both these ball joints is that the crude in the conduit has direct access to the seals.

FR2823284 describes a solution where the angular displacement of the joint is limited to the expansion of the bellows. Such bellows are made from high strength steel which is very susceptible to corrosion, e.g. stress corrosion cracking and hydrogen embrittlement from contaminations in crude oil such as Sulphur and Hydrogen.

The new design compared with the original APL design has improved sealing technics and also better bearing performance under high loads and large motions because the seals and the bearings are sliding onto separate bearings and by shifting the seal position from the ball equator closer to the poles gives an advantageous smaller hydrostatic load area because of the reduced seal diameter, and it opens up room for the negative load bearing/alternatively larger angular motion.

SUMMARY OF THE INVENTION

The invention relates to ball joint for connecting a riser subjected to high tensile and angular loads to a pipe connector on a floating unit, the ball joint comprising:

a suspension house comprising a spherical inner side, a suspension house neck and upper flange, wherein a toroidal bearing ring, having a bearing liner fastened to its inner surface, and an upper mating surface fastened to the corresponding mating surface on the lower side of the suspension house;

a spherical suspension ball, which is complementary to the inner side of the suspension house, comprising a suspension ball neck and lower flange, wherein the suspension ball is provided with a recessed portion is on the inside of the top portion of the suspension ball, the recessed portion comprising a tangential/cylindrical surface and a transverse circular plane surface; and a seal ring is positioned on top of a bias ring in the recessed portion;

wherein the seal ring provides at least one spherical seal in sealing contact with the inside of the suspension house and at least one piston seal in sealing contact, with an inner cylindrical surface of the recessed portion and wherein the bias ring provides biasing means biasing the seal ring in a direction parallel to the axis of the neck and away from the bias ring.

In a preferred embodiment the seal ring comprises: a circular downward directed groove comprising an inner mainly cylindrical vertical surface, being convexly curved in the vertical direction with a radius R1, an upper horizontal mainly circular surface, and an outer mainly cylindrical surface;

a spherical scraper ring mounted near the top of the spherical surface of the seal ring which is in close contact with the inner surface of the suspension house;

at least one spherical seal positioned under the spherical scraper ring;

a circular scraper ring mounted on the inner surface in close contact with the bias ring;

at least one piston seal mounted on the outer surface of the seal ring in sealing contact with the tangential/cylindrical surface of the suspension ball; and an outer mainly cylindrical surface being convexly curved with a radius R2 in the vertical direction.

Wherein the corresponding bias ring comprises: a toroidal body with a mainly rectangular cross-section comprising an inner cylindrical surface in mating contact with the vertical surface of the seal ring, an outer mainly cylindrical surface with a radius smaller than the radius of the outer cylindrical surface of the groove, and a mating surface at the lower side of the bias ring corresponding to the circular plane surface of the suspension ball; and biasing means to bias the seal ring in a direction parallel to the axis of the suspension ball neck and away from the bias ring.

SHORT DESCRIPTION OF THE DRAWINGS

The device will be described with reference to the figures. Like numerals describe like parts in the different figures.

FIGS. 3a and b shows a side view and a cross section of the ball joint respectively.

FIGS. 4a, b and c shows a side view, a cross section and a cordial section of the ring seal assembly.

Figure 5:
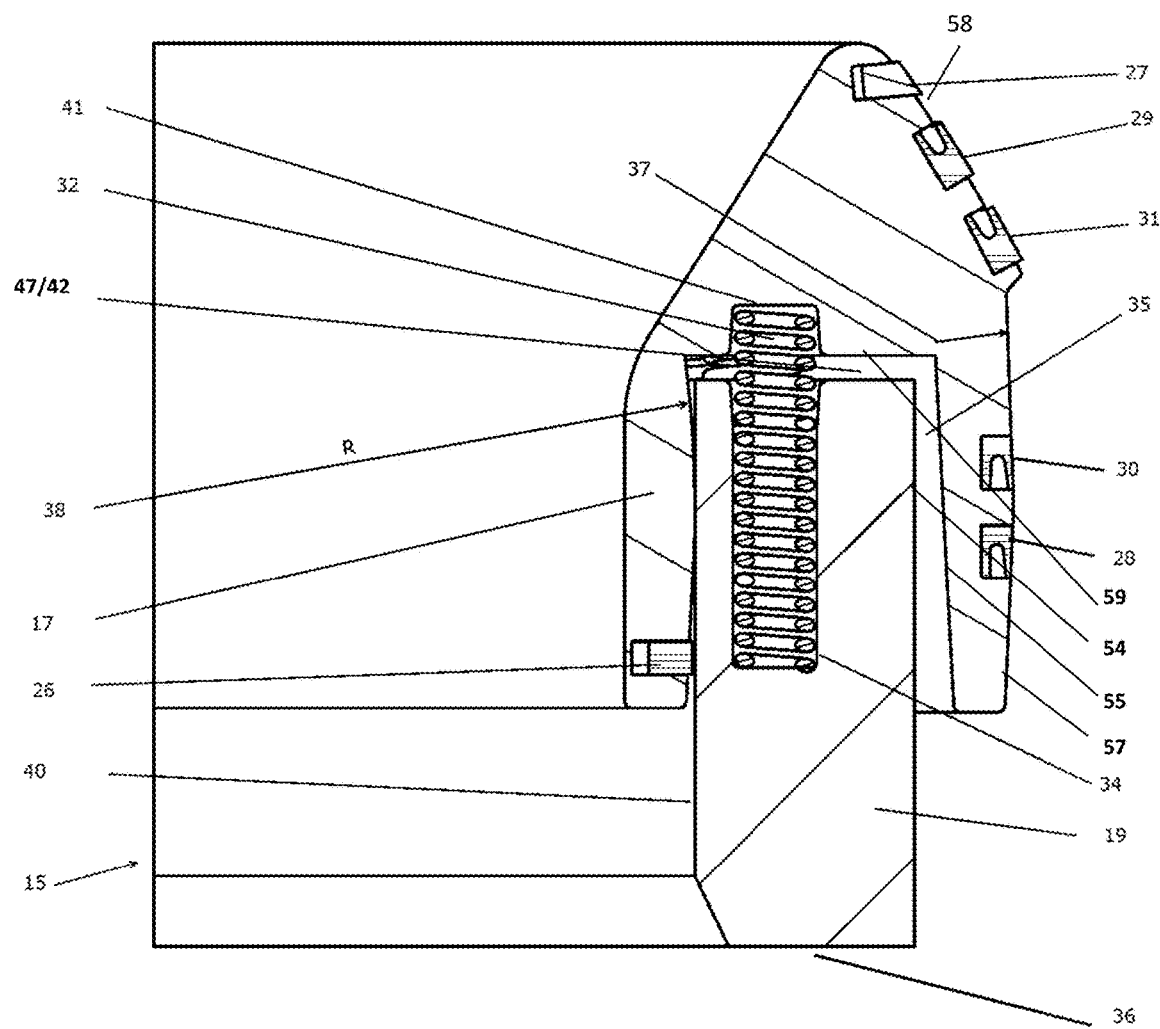

FIG. 5 shows an enlarged cross section of the seal ring and bias ring according to claim 3.

Figure 6:
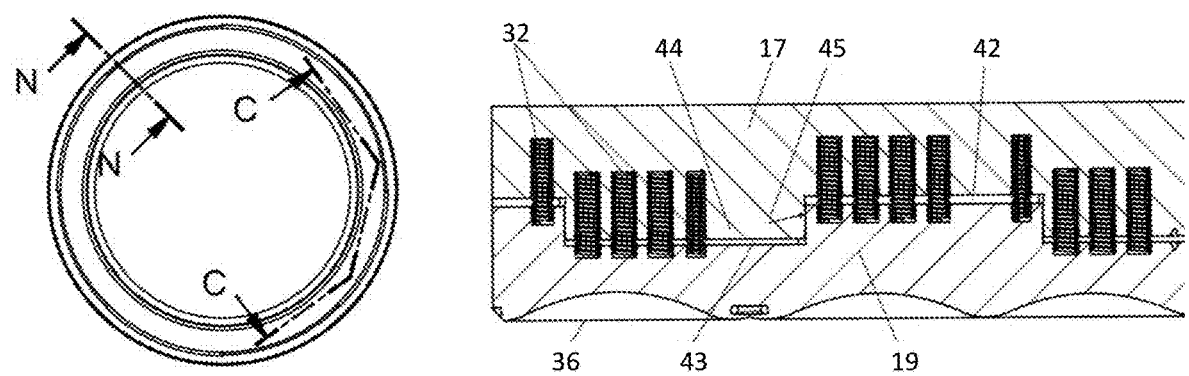

FIG. 6 shows three cordial sections of the ring seal assembly.

Figure 7:
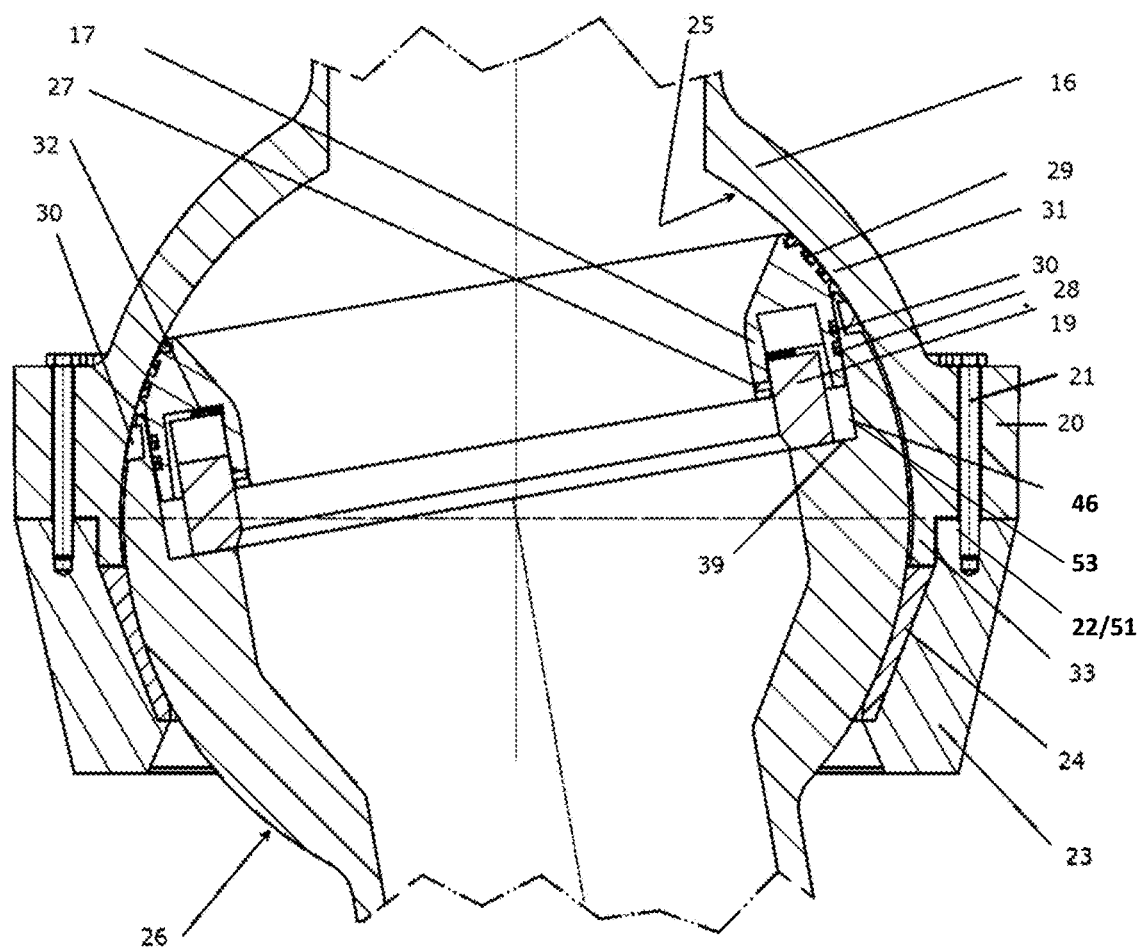

FIG. 7 shows a cross section of the ball joint at a small angle and with the suspension ball and suspension house in common center of rotation.

Figure 8:
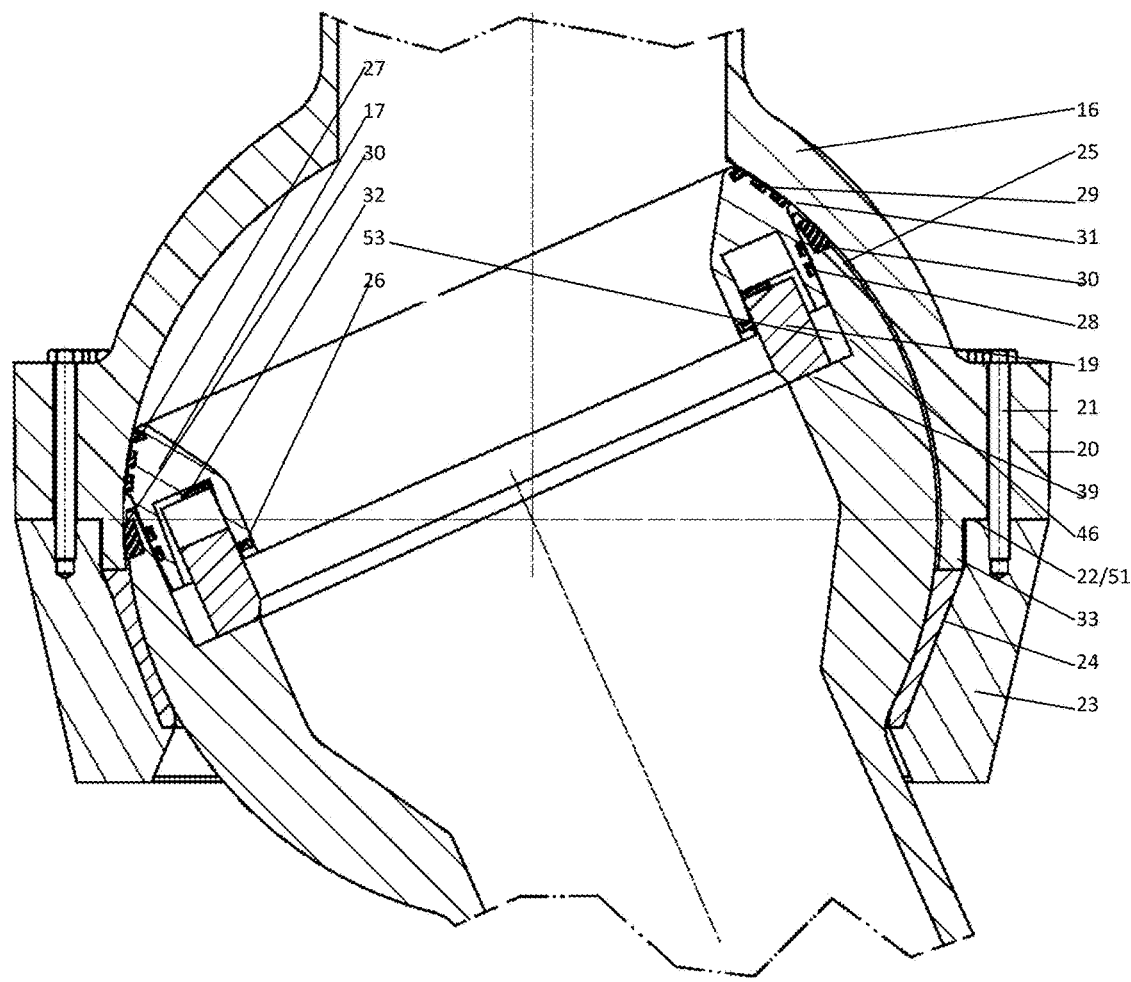

FIG. 8 shows a cross section of the ball joint at a larger angle and with same center of rotation as in FIG. 7.

Figure 9:
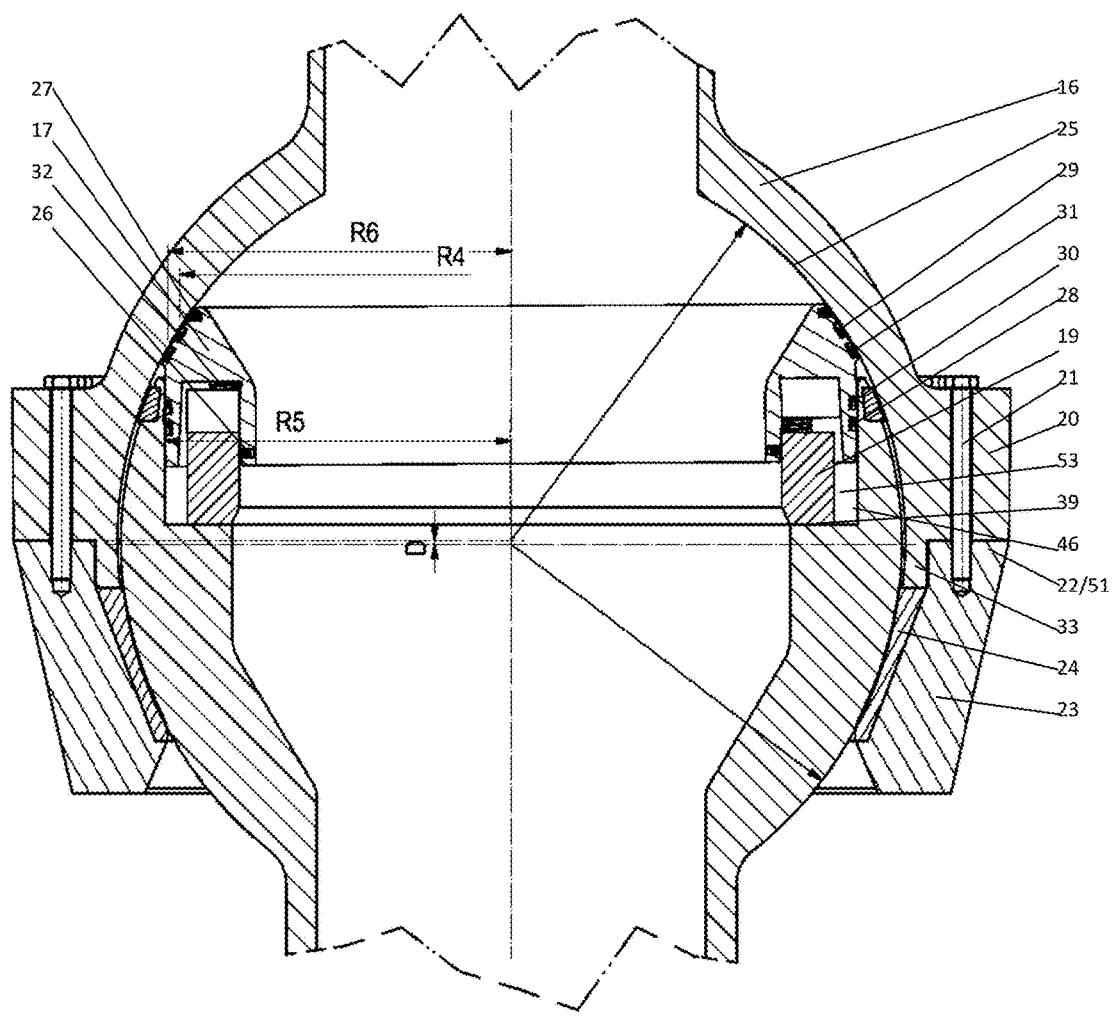

FIG. 9 shows a cross section of the ball joint with separate center points.

Figure 10:
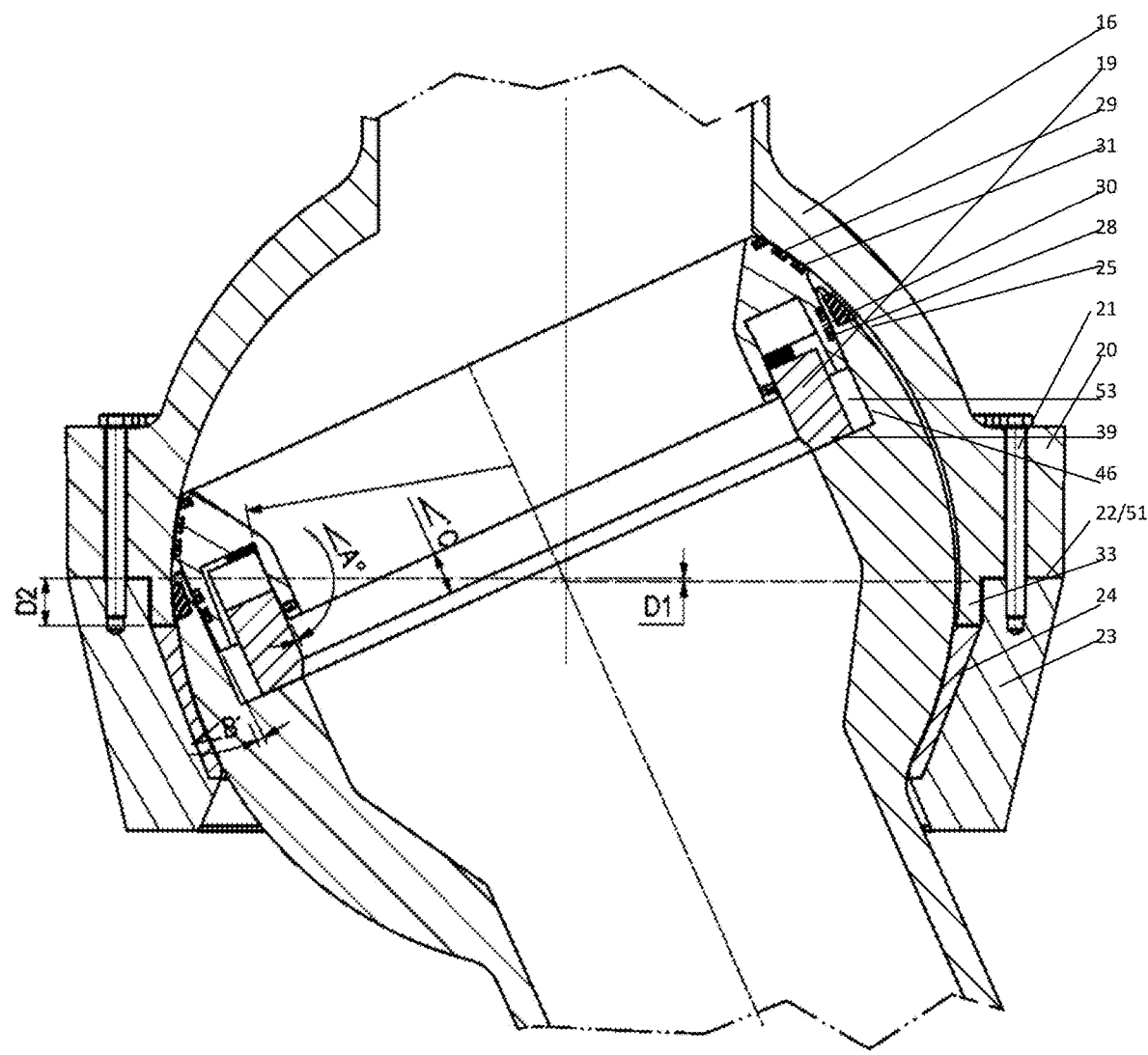

FIG. 10 shows a cross section of the ball joint with separate center points and tilted seal ring and a large angle on the riser.

Figure 11:
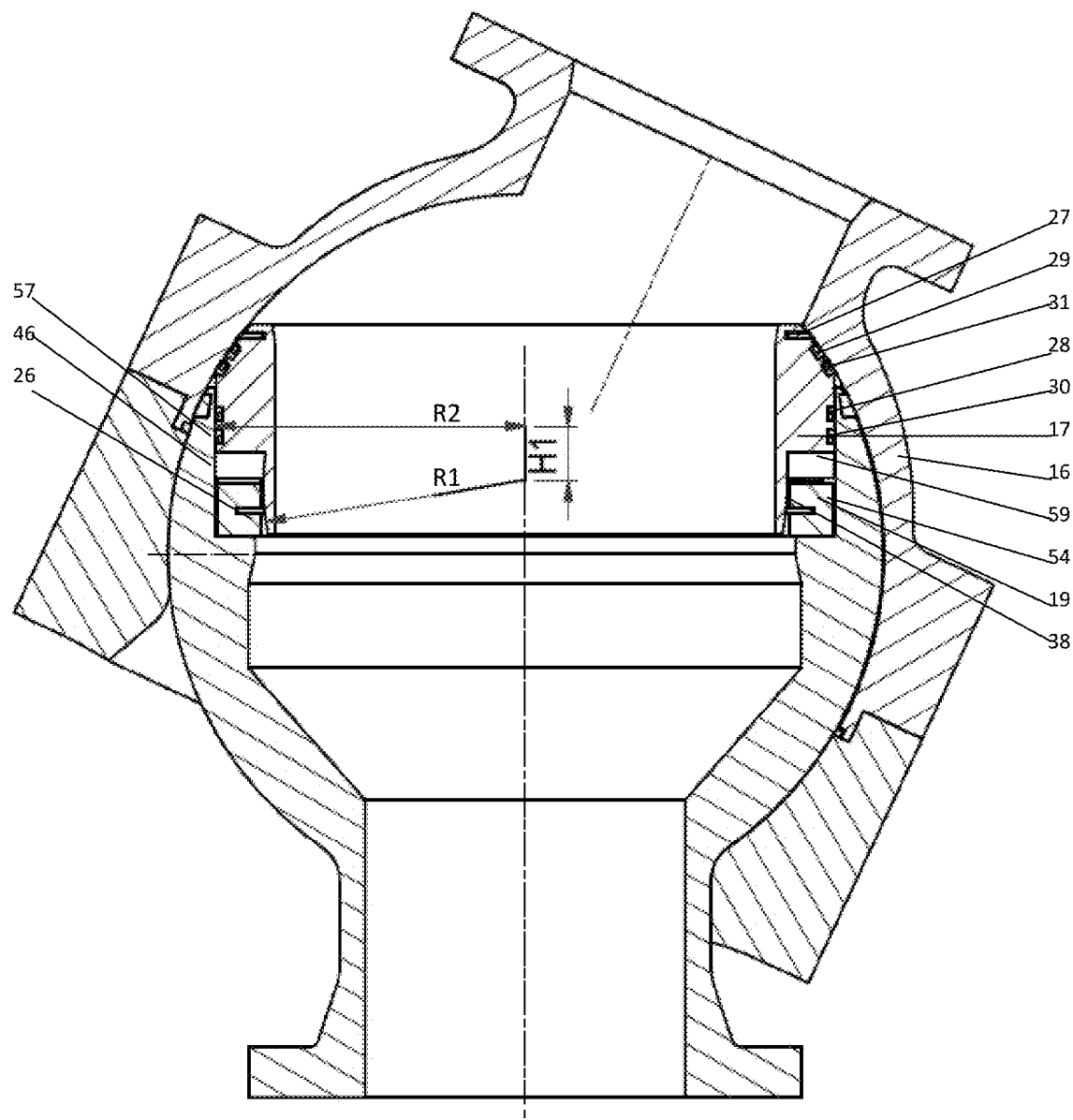

FIG. 11 shows the cross section of the ball joint with seal ring assembly according to claim 2.

DETAILED DESCRIPTION

Figure 1:
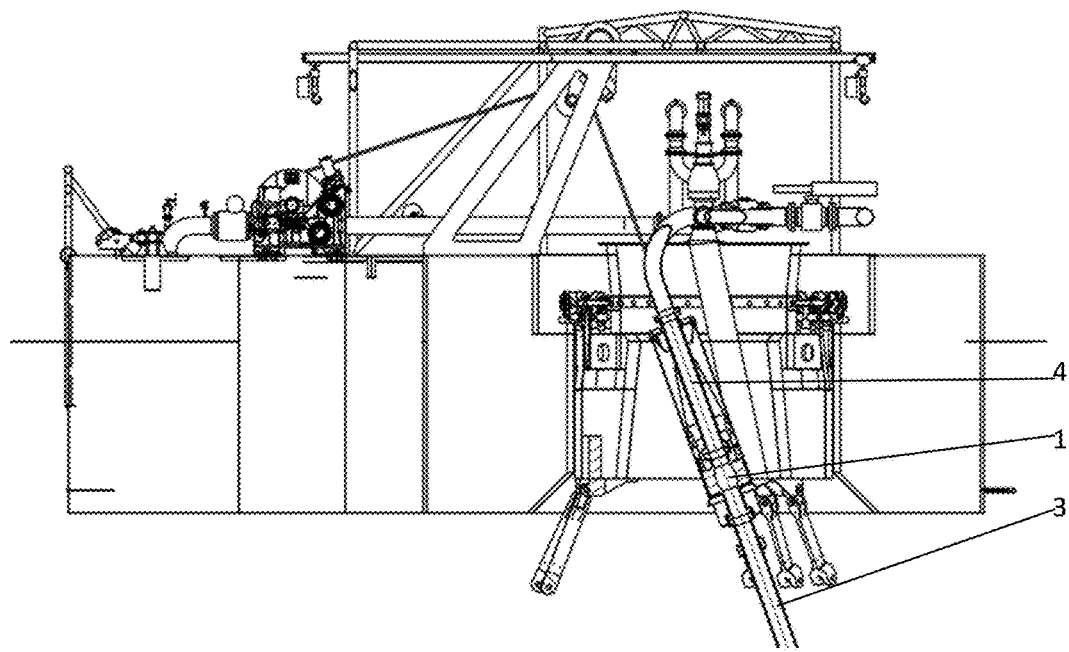
FIG. 1 shows a device for termination of a riser in a floating device with a turret.

FIG. 1 illustrates an application of the ball joint. The joint 1 is a connection between the flexible or rigid riser 3 and the connection pipe 4 within the turret. The advantage with such a joint is to avoid a hard spot area or release of the bending effects in the transition between a long catenary suspended riser 3 and the rigid turret structure. Such a transition is either handled by a bending stiffener in the area or by a joint such as the one described herein. The advantage with a ball joint is the reduced bending effects in the transitional region between the riser 3 and the turret. Especially in the case of steel risers, it is advantageous with a flexible joint such as a ball joint connection since those risers are much stiffer than the flexible risers and thus would create a severe hot spot in the transitional region of the turret.

Figure 2:
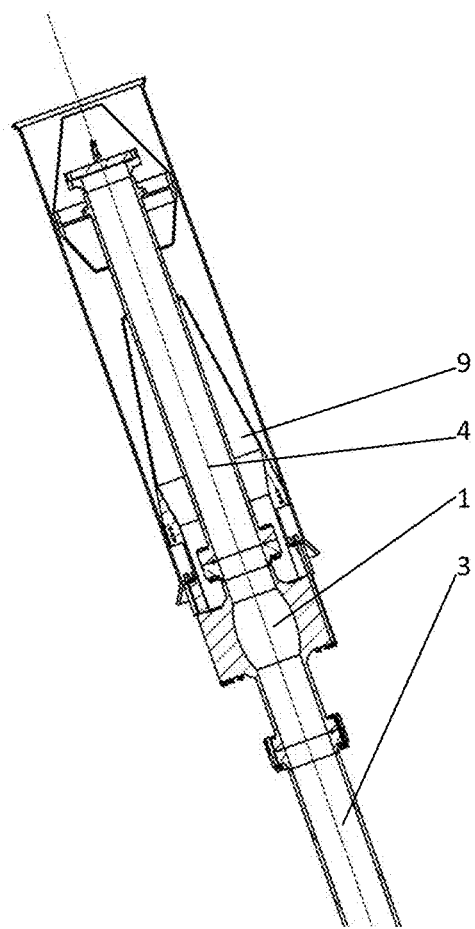
FIG. 2 shows an embodiment with the flexible joint, connection pipe, adapter and hang off structure resting in the guide pipe.

FIG. 2 shows a close up of the connection pipe 4 with the ball joint 1 and the top portion of the riser 3. The ball joint is here for simplicity shown as a solid body and is clamped to an adapter device 9 for additional strength compared with the ball joint in FIG. 3 which is adapted for bolting to the connection pipe 4 by the flange 11 only.

FIG. 3a is showing a side view of a ball joint of a preferred embodiment and FIG. 3b is showing a cross section of a preferred embodiment.

The ball joint comprises a flange 11 for connection to the connection pipe 4 in top end and a flange 12 in the lower end for connection to the riser.

A neck 10 connects the flange with the suspension house 16 on the top side, and a neck 13 connects the flange 12 with the suspension ball 14 on the lower side.

The lower portion of the suspension house 16 is shaped as a flange 20 with a mating face 22 for being connected to the bearing ring 23, with a corresponding mating face 51. The bearing ring includes a glide bearing liner 24 which is complementary shaped to the suspension ball 14. The seal ring and the bias ring in the ball joint are advantageously made of bronze, preferably leaded bronze, while the suspension ball and suspension house preferably are made of some corrosion resistant steel alloys. Bolts 21 clamp the bearing ring 23 to the flange part 20 of the suspension ball 14. Risers do normally have pull tension loads, i.e. the ball is normally being pulled downwardly. Hence the joint has been adapted primarily for tension loads. However, the riser loads in some applications and under special circumstances, may be negative, or directed upwards. A negative load bearing 18 is inserted into the suspension ball 14. A floating seal assembly 15 is arranged within the ball joint. It includes the two main components the seal ring 17 and the bias ring 19.

Figure 4:
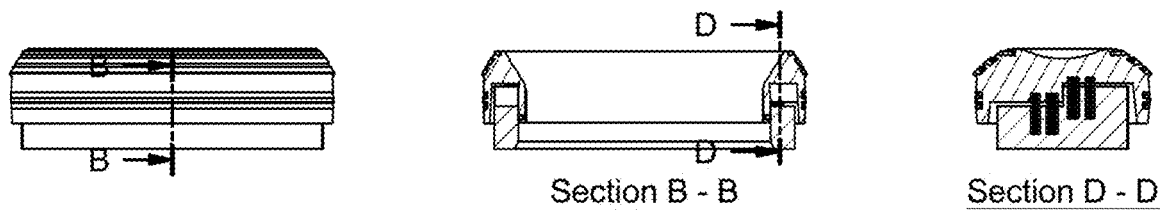

FIG. 4 is showing the side view of the seal ring assembly, a cross section D-D in way of a recess transition of the seal ring and a tangential section through the seal ring assembly 15.

FIG. 5 shows an embodiment of the seal assembly 15 as it will be mounted in the ball joint. The cross section of two main structures—the seal ring 17 and the bias ring 19 is clearly shown. The seal ring comprises a circular downward directed groove 47 comprising an inner mainly cylindrical vertical surface 38, being convexly curved in the vertical direction with a radius R1, an upper horizontal mainly circular surface 59, and an outer mainly cylindrical surface 55. The seal ring further comprises a spherical scraper ring 27 mounted near the top of a spherical surface 58 of the seal ring 17 which is in close contact with the inner surface 25 of the suspension house 16, at least one spherical seal 29, 31 positioned under the spherical scraper ring 27, and a circular scraper ring 26 mounted on the inner vertical surface 38 in close contact with the bias ring 19. The scraper rings 26, 27 prevent dirt from entering into the sealing region from the top side and between the two rings 17, 19 respectively. The seal ring also comprises at least one piston seal 28, 30 mounted on the outer surface 57 of the seal ring 17 in sealing contact with the tangential/cylindrical surface 46 of the suspension ball 14, and finally an outer mainly cylindrical surface 57 being convexly curved with a radius R2 in the vertical direction. The surface is preferably curved in the region between the piston seals 28,30, but may either be curved all the way or be partially tapered above the seal 30 and below the seal 28. FIG. 5 shows a primary piston seal 28 and a secondary piston seal 30 mounted in seal grooves in the seal ring 17 for sealing the conduit pressure coming from the bottom side of the seal assembly 15 and from between the seal ring 17 and the bias ring 19. The convex curvature of the surfaces 57 and 38 is to prevent jamming of the seal ring 17 inside the recessed portion 53 and the inner surface 40 of the bias ring 19, respectively. There is further a substantial clearance between the outward cylindrical surface 54 of the bias ring 19 and the inward facing surface 55 of the seal ring 17. These features permit the seal ring to move freely axially and to tilt when it is subjected to changes in the position of the mating sealing surface 25 causing the seal ring 17 to displace and tilt while still keeping the seal ring 17 and the bias ring 19 in suitable relative radial position since there are close tolerances in way of the contact at the tangent point between the surfaces 38 and 40. The radius R1 and the radius R2 have lengths a little shorter than the radius of the contacting surfaces 40 in ring 19 and the inward surface 46 of the recess in the suspension ball to obtain suitable clearance for a smooth operation. The corresponding bias ring 19 comprises a toroidal body with a mainly rectangular cross-section comprising an inner cylindrical surface 40 in mating contact with the inner vertical surface 38 of the seal ring 17, an outer mainly cylindrical surface 54 with a radius smaller than the radius of the outer cylindrical surface 55 of the groove 47, and a mating surface 36 at the lower side of the bias ring 19 corresponding to the circular plane surface 39 of the suspension ball 14, and biasing means 32 to bias the seal ring 17 in a direction parallel to the axis of the suspension ball neck 13 and away from the bias ring 19.

In its simplest form shown in FIG. 11 the seal ring 17 comprises a circular downward and outward directed recess instead of a groove 47, wherein the recess comprises an outward facing mainly cylindrical vertical surface 38, being convexly curved with a radius R1, and an upper horizontal circular surface 59. The seal ring further comprises a spherical scraper ring 27 mounted near the top of the spherical surface 58 of the seal ring 17 which is in close contact with the corresponding inner surface 25 of the suspension house 16. The scraper ring 27 prevents dirt to enter from the top side of the seal ring 17. The seal ring further comprises at least one spherical seal 29, 31 positioned under the spherical scraper ring 27 on the spherical surface 58, a piston scraper ring 26 mounted on the inner vertical surface 38 in close contact with the bias ring 19, in order to prevent dirt from entering between the two rings. The seal ring 17 also comprise at least one piston seal 28, 30 mounted on the outer surface 57 of the seal ring 17 in sealing contact with the tangential/cylindrical surface 46 of the suspension ball 14; and finally an outer mainly cylindrical surface 57 being convexly curved in the vertical direction with a radius R2, in order to prevent jamming of the seal ring when it is subjected to forces in different directions;

The corresponding bias ring 19 of this embodiment of the invention comprises a toroidal body with a mainly rectangular cross-section comprising an inner cylindrical surface 40 in close contact with the vertical surface 38 of the seal ring 17, an outer mainly cylindrical surface 54 with a radius slightly smaller than the radius of the cylindrical surface 46 of the recessed portion 53, and a mating surface 36 at the lower side of the bias ring 19 corresponding to the circular plane surface 39 of the suspension ball 14; and biasing means 32 to bias the seal ring 17 in a direction parallel to the axis of the suspension ball neck 13 and away from the bias ring 19. As will be explained later, this embodiment gives larger horizontal movement because the height of the seal ring 17 is larger. This is due to the fact that the piston seals 28, 30 must be positioned above springs 32 and mating protrusions 44 and recesses 45, as opposed to an embodiment wherein the bias ring 19 is partly positioned inside the groove of the seal ring 17. Hence the contact area between the seal ring and the suspension ball is at a higher elevation than the contact area between the spring keeper ring and the seal keeper ring.

A piston scraper ring 26 mounted on the inner mainly cylindrical vertical surface 38 prevents dirt from entering a cavity 35 between the seal ring 17 and the bias ring 19 inside the sealing ring assembly together with the close contact between the contact surface 36 and the complementary surface 39 in the suspension ball.

The cavity 35 may advantageously be filled with grease for protection of the springs and improved gliding conditions between the various gliding surfaces. Springs 32 is located in holes 41 in the seal ring and holes 34 in the bias ring. The holes are advantageously coned toward the respective top surfaces for fair support of the springs whenever the seal ring and bias ring attain an angular displacement during operation as will be explained below, ref. FIGS. 9 and 10.

The cavity includes a space 42 on top of the bias ring 19 to permit a vertical displacement of the seal ring 17 vs the bias ring 19. The advantage with this space is seen from FIG. 9 compared with FIG. 8: that the two rings will attain a relative angle when the suspension ball (with the riser) pivots to one side. Such angular displacement will not occur for a theoretically correct ball joint, with all center points in theoretical positions. However, as the bearing is wearing off by time and the structural elements get deformed under the high riser loads and internal pressure effects, these center points will no longer align. The consequent eccentricities will cause the seal ring 17 to tilt relative to the bias ring 19 when the suspension ball turns relative to the suspension house.

The two rings are kept radially positioned by the two contacting surfaces 38 and 40, which are in close contact. And the outward cavity 35 is hence kept with sufficient room to keep clearance between the two rings. The contacting surface 38 is advantageously curved with a radius corresponding with the center axis of the ball joint for easy relative angular displacement of the two rings.

FIG. 6 is showing from the left the seal ring seen from top, and section C-C showing the seal ring assembly in an unfolded view. The seal ring 17 includes of a plurality of recessed portions while the bias ring 19 includes complementary shaped inverse recessed portions. This leaves spaces 42 and 43 between the respective pairs of rings. As may be seen from the sketch there is 6 coil springs positioned in each recessed portion of the two rings. Some springs are not shown since the section C-C is outside the pitch circle for the springs.

The end face 45 of the downward protruding portion 44 of the seal ring 17 may be curved to allow relative angular displacements between the two rings.

The recessed portions of the seal ring 17 and the bias ring 19 and the advantageously shaped end faces 45 is intended to keep these two rings rotationally locked to one another for the sake of the integrity of the coil springs.

FIG. 7 is showing the close up view of a section through the ball joint when the suspension ball 14 is turned at an angle 10 degree to one side. All components including the suspension ball, seal assembly 15 and the suspension house 16 are in the theoretical, designed positions.

FIG. 8 is showing the ball joint at an angle of 25 degrees. All components are placed in designed position, with their common center of rotation.

Figure 3:
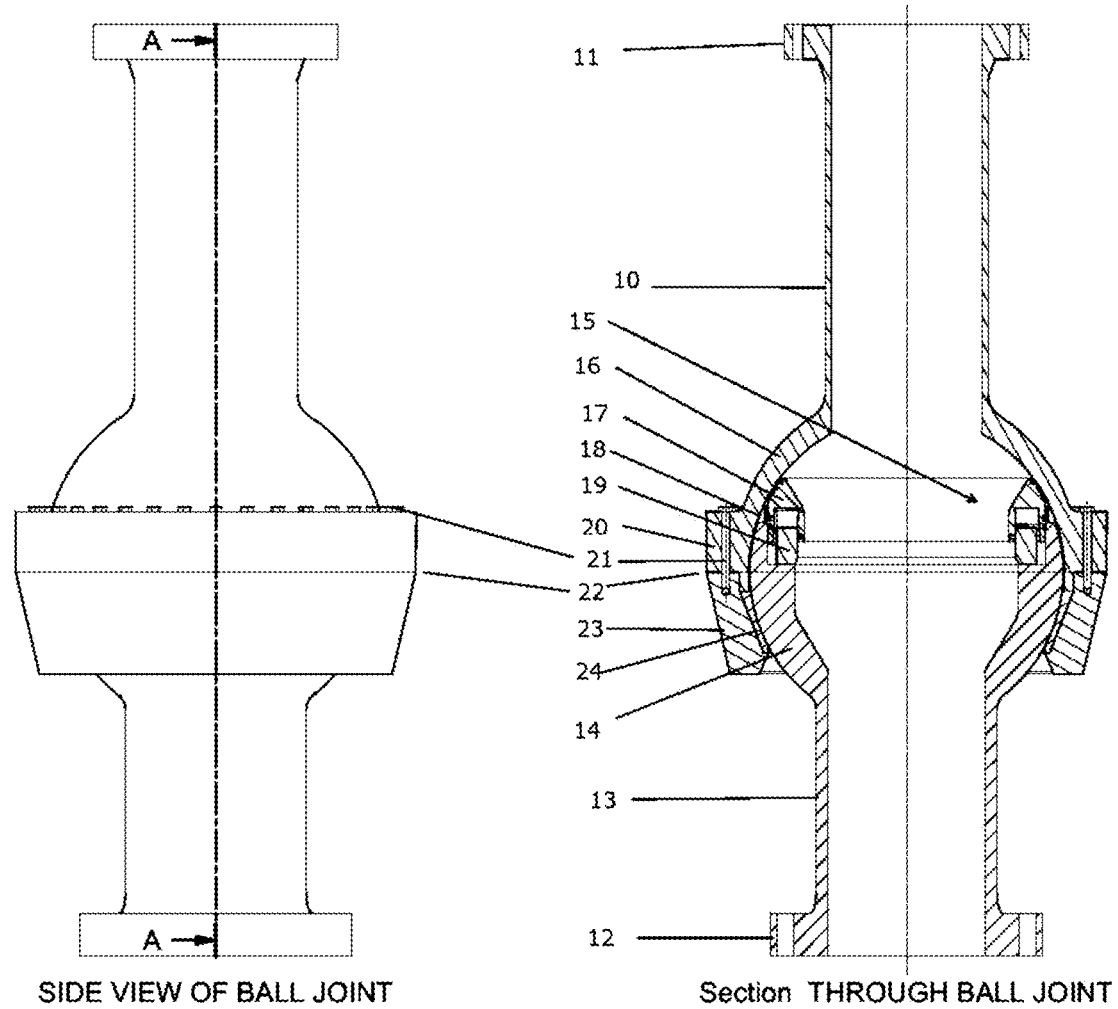

FIG. 9 is showing the suspension ball 14 at zero angle as in FIG. 3. The suspension ball 14 is however displaced downward a short distance D, to simulate the effect of wear in the bearing liner 24, and resulting clearances between the suspension ball 14 and the mating components. Further, there will be some deformations caused by the riser tension and internal conduit pressure in the joint; the bearing ring 23 opens up a little and the suspension ball shrinks a little under the pressure of the riser loads. The springs 32 between the two rings, the seal ring 17 and the bias ring 19 ensures that the seal ring with the seals maintains a suitable sealing pressure against the sealing mating surface in the suspension house 16.

FIG. 10 is depicting the suspension ball displaced downward 5 mm due to wear in the bearing liner as showed in FIG. 9, but tilted to the same angle as the ball joint shown in FIG. 8. The seal ring 17 with the seals is getting an angular displacement C relative to the bias ring because of the eccentricity D1. This angular movement is energized by the coiled springs having a suitable spring characteristics ensuring correct sealing pressure even at large changes in sealing gap.

Ordinary lip seals with a cross section of about 10 mm are able only to handle a fraction of what these coiled springs are capable of.

The bias ring 19 is free to move laterally on the recessed surface 39 (FIG. 7) when the seal ring tilts at angle <C (FIG. 10). The seal ring 17 has preferably curved contacting surfaces 38 and 57 with the radiuses R1 and R2 allowing the two rings to freely tilt relative to one another. The clearance between the two rings 17, 19 are sufficient to keep them radially aligned and free to move angularly relative to each other, but tight enough to keep the holes with the seats for the springs sufficiently aligned.

The magnitude of the horizontal movement of the bias ring 19 is mainly determined by the angle <C above and a) the elevation difference between the contact point between the two rings 17, 19 in their surfaces 38, 40 and b) The elevation difference between contact point between the seal ring 17 and the suspension ball in their surfaces 57 and 46, in practice the contact between the piston seal(s)(28, 30) and the cylindrical surface 46. The magnitude of the horizontal movement will then to a good approximation be H1×sin C, where H1 is more clearly seen in FIG. 11.

FIG. 11 is depicting an alternative embodiment of the seal keeper ring and the bias rings in the suspension ball. The bias ring is arranged underneath the seal keeper ring for a larger free bore for the product flow within the ball joint. The seal ring 17 is thereby requiring less room and has a simpler shape to fabricate since the groove 47 has just one outward facing surface 38. (It is then easier to machine the recesses 44 and the contacting faces 45 allowing access for milling from the outside instead of just from top).

The tilting of the seal ring 17 by the angle <C is a function of a) the deviation/displacement D1 of the center of the suspension ball 14 and relative to the center of the suspension house 16 caused by e.g. wear in the bearing liner 24; b) the elevation difference between the center of the seal mating surface 25 of the suspension house 16 and the contact point between the cylindrical surface 46 in the suspension ball 14 and the surface 38/57 of the seal keeper ring 19, or in practice the contact between the piston seals 28/30 and the mating piston seal surface, the cylindrical surface 46, and c) the turning angle of the suspension ball 14 relative to the suspension house 16.

Referring to FIG. 11, H1 is the vertical distance measured along the centerline for the cylindrical surface 46 in the suspension ball, between a) The elevation of the horizontal/radial guiding of the seal ring 17 within the suspension ball, i.e. the tangent point between the outward surface 38 and the mainly cylindrical inward surface 40 of the bias ring 19 and b) The elevation of the contact point between the outward face 57 of the seal ring 17 having a curvature R2 and radially guided by the cylindrical surface 46 of the suspension ball 14. The difference between the seal ring in FIG. 11 and in FIG. 5 is typically the substantial downward change in the vertical position of the bias ring 19 and a higher seal ring 17 with the contact point between the seal ring 17 and the bias ring 19 displaced downward. Typically the movement will be parts of a mm to a few millimeters, and it is conceivable that for applications with small angular movements on the riser 3 and/or seal rings 17 with low heights, the bias ring 19 may be fixed to or be an integral part of the suspension ball 14.

If the bias ring 19 is fixed or integrated in the suspension ball for alternative embodiments where the height H1 is substantially larger than 0, one may risk that the seal ring 17 will be prevented from tilting and the sealing pressure between the sealing rings and the suspension house 16 may be lost.

It is furthermore an important feature that the clearance between the seal ring 17 and the bias ring 19 is tight in order to avoid misalignments between the supports for the coiled springs. That is why it is important to handle the horizontal translations between the bias ring 19 and the suspension ball instead of between the seal ring 17 and the bias ring 19.

Seal Ring Function:

The seal ring assembly 15 is thus free to float horizontally relative to the suspension ball. And the seal ring 17 is thus free to translate with the bias ring 19 radially as the suspension ball is tilting even when the center of the suspension ball and the suspension house are separate. As an important feature, the seal ring 17 is also free to tilt at small angles relative to the bias ring 19 which is very important for the large angular displacement of the riser with the suspension ball 14, still more as the bearing liner 24 attains wear.

It is important for seals to operate at correct sealing pressure. The springs 32 provide sufficient sealing pressure when the pressure in the cavity 35 is close to nil or very small.

As the pressure increases the sealing load will also increase by the piston effect created from the piston seals 28 and 30 (FIG. 5) with a diameter R5 (FIG. 9). The "piston effect" or the hydrostatic load onto the seal ring is advantageously limited by spherical seal ring locations at R4 and R6 (FIG. 9) corresponding with the diameter of the primary and secondary spherical seals.

The advantage with this counter effect is that the sealing load onto the seals 29, 31 are limited with regard to seal wear and integrity, and also for limiting the turning resistance for the joint, while sufficient for the sealing function.

The piston seal diameter is importantly larger than the sealing diameter for the larger of the two spherical seals to avoid the seal ring from getting a negative effect on the sealing load.

The mating surface for the spherical seals is advantageously extended beyond the equator of the ball by the length D2 (FIG. 10) giving a larger working tilting angle for the ball joint.

The scraper rings are advantageously keeping dirt in the fluid conduit from settling down onto the sealing surfaces and to get access into the springs within the seal ring assembly 15.

In an embodiment wherein the bias ring 17 is fixed to or is an integral part of the suspension ball 14 the biasing means may be provided by a sealed chamber 35 between the two rings 17, 19 which is pressurized by a gas or liquid being supplied through a channel inside the suspension ball 14 and neck 13.

It should be noted that the described embodiments are examples only and that numerous variations and combinations are possible, which are not described specifically here, but still fall within the scope of the independent claim which defines the invention.

The invention claimed is:

1. A ball joint for connecting a riser subjected to high tensile and angular loads to a pipe connector on a floating unit, the ball joint comprising:
   a suspension house comprising a spherical inner side, a suspension house neck and an upper flange, wherein a toroidal bearing ring, having an inner surface and a bearing liner fastened to the inner surface, and an upper mating surface fastened to a corresponding mating surface on a lower side of the suspension house;
   a spherical suspension ball, which is complementary to the spherical inner side of the suspension house, the spherical suspension ball comprising a suspension ball neck and a lower flange,
wherein the suspension ball comprises a recessed portion provided on an inside of a top portion of the suspension ball, the recessed portion comprising an inner tangential/cylindrical surface and a transverse circular plane surface; and a seal ring positioned on top of a bias ring in the recessed portion;
wherein the seal ring provides at least one spherical seal in sealing contact with the spherical inner side of the suspension house and at least one piston seal in sealing contact with the inner tangential/cylindrical surface of the recessed portion and wherein the bias ring provides biasing means biasing the seal ring in a direction parallel to an axis of the suspension ball neck and away from the bias ring.

2. The ball joint according to claim 1 wherein the seal ring comprises:
   a circular downward and outward directed recess comprising an outward facing cylindrical vertical surface, being convexly curved with a radius R1, and an upper horizontal circular surface;
   a spherical scraper ring mounted near a top of a spherical surface of the seal ring which is in close contact with the corresponding spherical inner side of the suspension house;
   the at least one spherical seal positioned under the spherical scraper ring on the spherical surface of the seal ring;
   a piston scraper ring mounted on the outwardly facing cylindrical vertical surface in close contact with the bias ring;
   the at least one piston seal mounted on an outer cylindrical surface of the seal ring in sealing contact with the inner tangential/cylindrical surface of the suspension ball; and
   the outer cylindrical surface of the seal ring being convexly curved in the vertical direction with a radius R2;
and wherein the bias ring comprises:
   a toroidal body with a rectangular cross-section comprising an inner cylindrical surface in close contact with the outwardly facing cylindrical vertical surface of the seal ring, an outer cylindrical surface with a radius slightly smaller than a radius of the inner tangential/cylindrical surface of the recessed portion, and a mating surface at a lower side of the bias ring corresponding to the transverse circular plane surface of the suspension ball; and
   biasing means to bias the seal ring in a direction parallel to the axis of the suspension ball neck and away from the bias ring.

3. The ball joint according to claim 2, wherein the biasing means are disc or blade springs.

4. The ball joint according to claim 2, wherein the suspension ball comprises a circular negative load bearing near the top portion of the suspension ball.

5. The ball joint according to claim 2, wherein the toroidal bearing ring is fastened to the suspension house with bolts.

6. The ball joint according to claim 2, wherein the bias ring is fixed to or is an integral part of the suspension ball.

7. The ball joint according to claim 1 wherein the seal ring comprises:
   a circular downward directed groove comprising an inner cylindrical vertical surface, being convexly curved in the vertical direction with a radius R1, an upper horizontal circular surface, and an outer cylindrical surface;
   a spherical scraper ring mounted near a top of the spherical surface of the seal ring which is in close contact with the spherical inner side of the suspension house;
   the at least one spherical seal positioned under the spherical scraper ring;
   a circular scraper ring mounted on the inner surface of the seal ring in close contact with the bias ring;
   the at least one piston seal mounted on an outer cylindrical surface of the seal ring in sealing contact with the inner tangential/cylindrical surface of the suspension ball; and
   the outer cylindrical surface of the seal ring being convexly curved with a radius R2 in the vertical direction;
and wherein the bias ring comprises:
   a toroidal body with a rectangular cross-section comprising an inner cylindrical surface in mating contact with the outwardly facing cylindrical vertical surface of the seal ring, an outer cylindrical surface with a radius smaller than a radius of the outer cylindrical surface of the circular downward directed groove, and a mating surface at a lower side of the bias ring corresponding to the circular transverse plane surface of the suspension ball; and
   biasing means to bias the seal ring in a direction parallel to the axis of the suspension ball neck and away from the bias ring.

8. The ball joint according to claim 7 wherein the biasing means are provided by a sealed chamber between the seal ring and the bias ring wherein the chamber is pressurized by a gas or liquid being supplied through a channel inside the suspension ball and the suspension ball neck.

9. The ball joint according to claim 7, wherein the biasing means are disc or blade springs.

10. The ball joint according to claim 7, wherein the suspension ball comprises a circular negative load bearing near the top portion of the suspension ball.

11. The ball joint according to claim 7, wherein the toroidal bearing ring is fastened to the suspension house with bolts.

12. The ball joint according to claim 7, wherein the bias ring is fixed to or is an integral part of the suspension ball.

13. The ball joint according to claim 1 wherein the biasing means are a plurality of helical springs evenly distributed around the seal ring and the bias ring, said plurality of helical springs being recessed in corresponding cylindrical recesses in both the seal ring and the bias ring, and wherein one or more mating protruding and recessed portions are provided on the upper horizontal circular surface of the seal ring and the top surface of the bias ring, said one or more mating protruding and recessed portions being adapted to prevent relative circular movement.

14. The ball joint according to claim 13 wherein the recesses in both the seal ring and the bias ring are coned toward their respective top surfaces.

15. The ball joint according to claim 1, wherein the biasing means are disc or blade springs.

16. The ball joint according to claim 1, wherein the suspension ball comprises a circular negative load bearing near the top portion of the suspension ball.

17. The ball joint according to claim 1, wherein the toroidal bearing ring is fastened to the suspension house with bolts.

18. The ball joint according to claim 1, wherein the bias ring is fixed to or is an integral part of the suspension ball.

* * * * *